Oct. 9, 1945.   J. J. HAY   2,386,216
LOADING, HAULING, AND UNLOADING EQUIPMENT
Filed Dec. 31, 1943   4 Sheets-Sheet 1
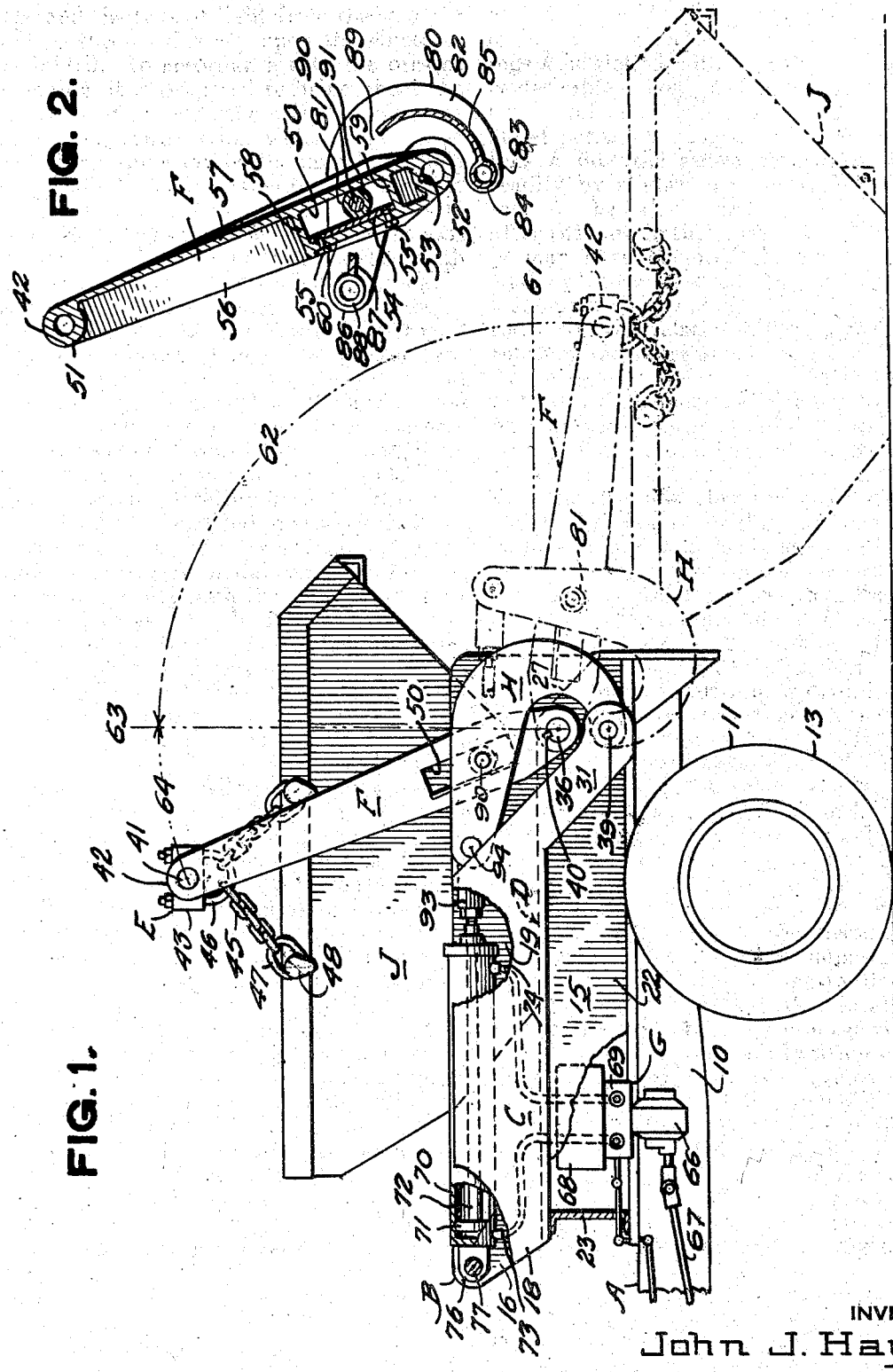
INVENTOR.
John J. Hay
BY
ATTORNEYS.

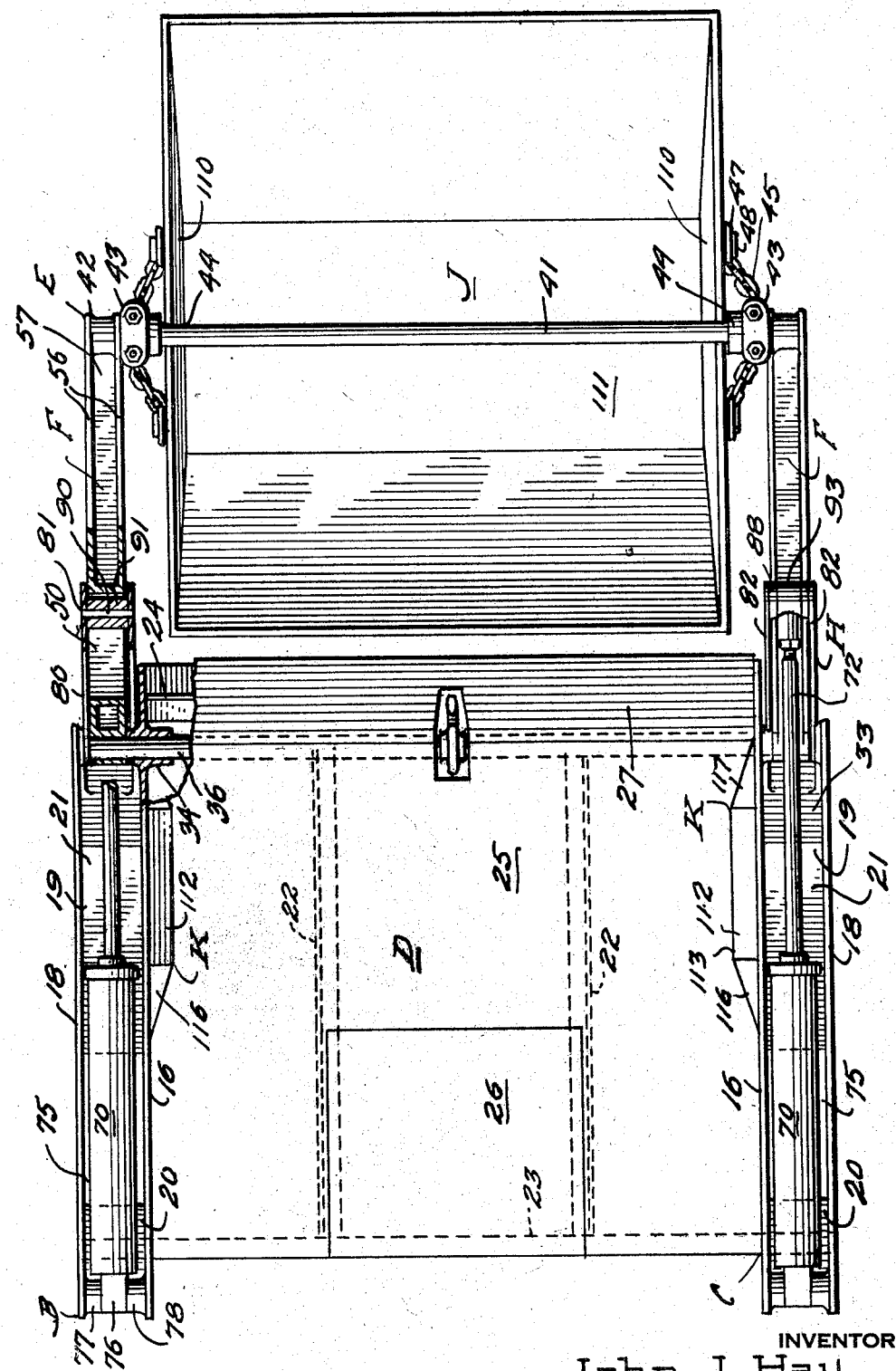

Oct. 9, 1945. J. J. HAY 2,386,216
LOADING, HAULING, AND UNLOADING EQUIPMENT
Filed Dec. 31, 1943 4 Sheets-Sheet 3
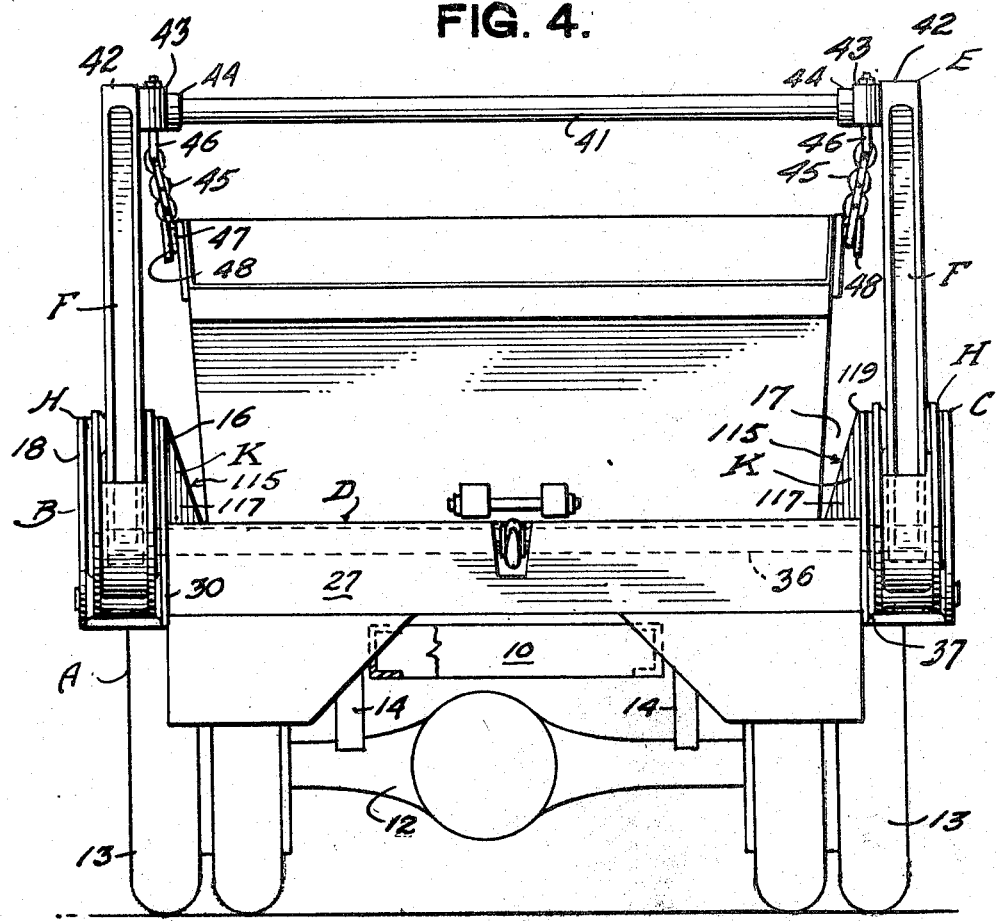
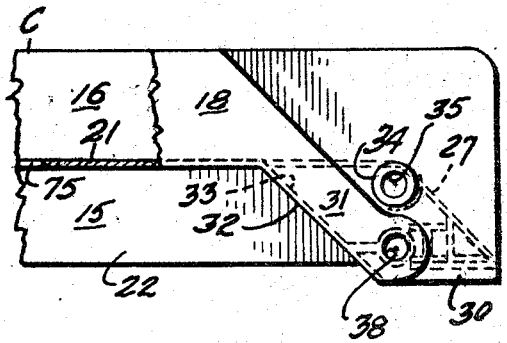
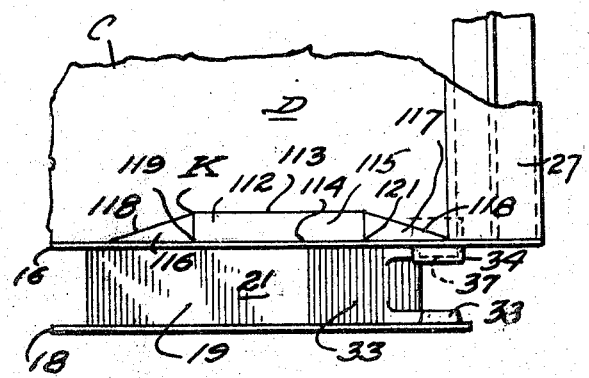
INVENTOR.
John J. Hay

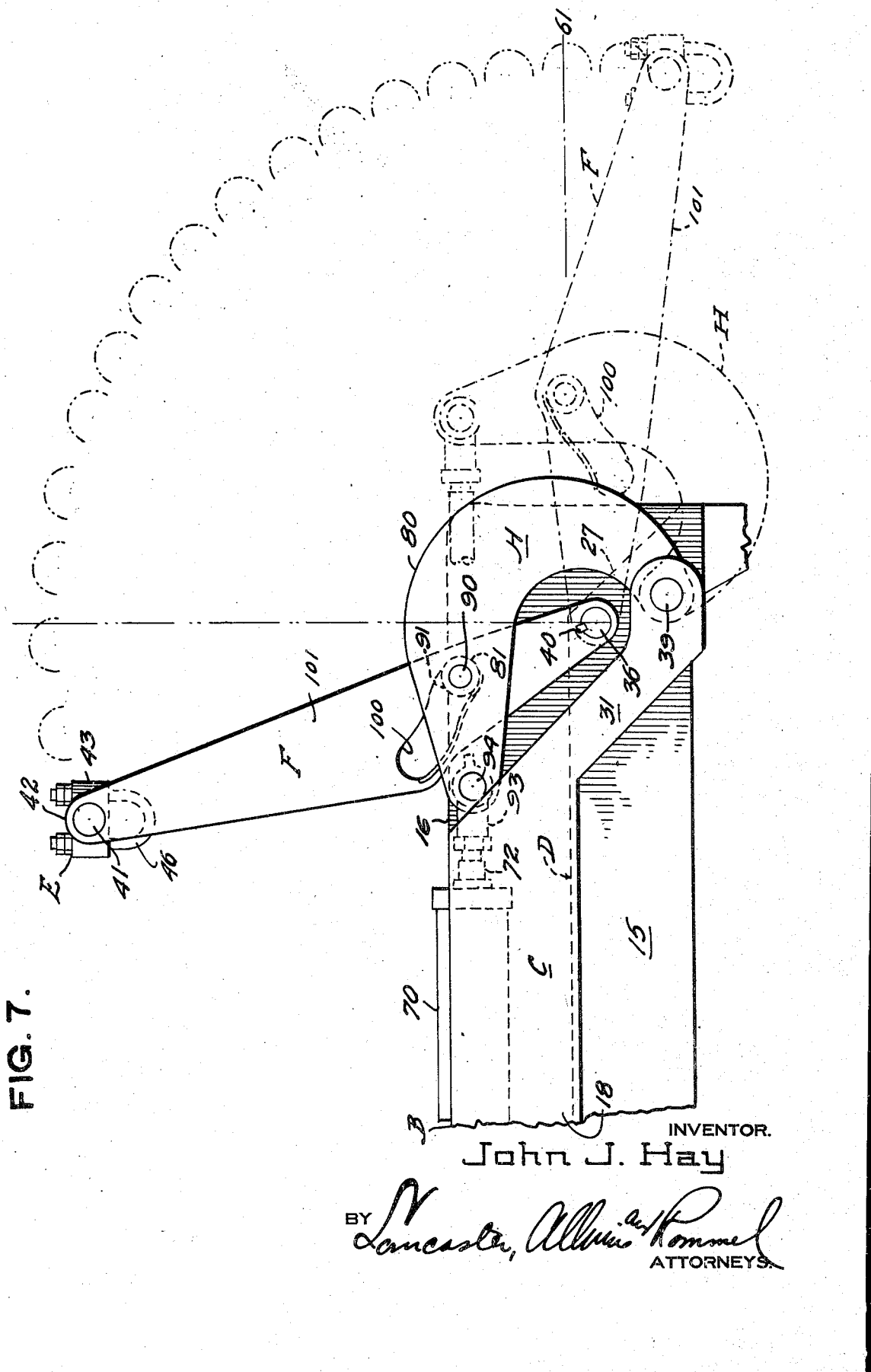

Patented Oct. 9, 1945

2,386,216

UNITED STATES PATENT OFFICE 2,386,216

LOADING, HAULING, AND UNLOADING EQUIPMENT

John J. Hay, Knoxville, Tenn., assignor to Brooks Equipment and Mfg. Co., Knoxville, Tenn., a corporation of Tennessee Application December 31, 1943, Serial No. 516,439

11 Claims. (Cl. 214—77)

The present invention relates to loading, hauling and unloading equipment particularly well adapted for use on the ordinary or standard motor truck chassis. It is particularly useful, although not necessarily limited for use where it is advisable or necessary to employ hand labor for loading buckets, which may be hoisted, transported and either dumped or deposited on the ground at the point of destination.

It has been proposed in the past to provide such equipment where several buckets are provided, the workman constantly loading and the truck constantly transporting loaded buckets so there need be no idle time, that is, the workmen do not have to wait for trucks to pull up, and the trucks do not have to stand idle for loading. Such equipment is shown in United States patents on the inventions of Lew Wallace Brooks No. 2,200,020 granted May 7, 1940, and No. 2,313,514 granted March 9, 1943.

The present invention has for one of its objects the provision of improved equipment of this character which will permit use of buckets of substantially the same capacity as those used in the past, but which may be wider and lower in height, to make hand loading easier, and to lower the center of gravity on the truck of the "pay-load" in the bucket. Equipment on a truck chassis cannot, for safety and practical purposes, project laterally thereof to the extent where it will be a hazard in traffic or prevent its use in restricted quarters. Therefore it is not feasible to widen the over-all width of the loading and unloading equipment on the truck chassis, in an effort to permit use of wider buckets and thereby lower the center of gravity of the "pay-load," or reduce the height of the buckets in order to minimize fatigue when hand loading the buckets. I accomplish the object by making the loading and unloading equipment as compact as possible consistent with efficiency in taking care of heavy loads and time-saving characteristics.

In a practical example of the present invention hydraulic hoisting mechanism is used. In the past this has included a hydraulic motor including double acting cylinders with pistons, operated by a pump, receiving its power through a "power take-off" from the truck engine, with suitable liquid reservoir and valve mechanism (under control of the operator), operatively connected between the pump and cylinders. An example of such hydraulic hoisting mechanism is shown in the aforesaid Patent No. 2,313,514. To furnish the necessary pressure in the cylinders for operation of the loading and unloading mechanism, and accomplish the work with dispatch, it was found necessary to use a high speed power take-off which was found to be somewhat complicated and of higher cost than the so called "standard" low speed power take-off available for performing various work, utilizing the truck motor as a prime mover. Another object of the invention is therefore to provide loading and unloading equipment which will permit use of the "standard" or low-speed power take-off without sacrificing efficiency and time saving characteristics.

A further object of the invention is to provide loading, hauling and unloading equipment comprising a hoist, including companion lift arms, pivoted one at each side portion of the equipment adjacent the rear of the truck chassis, a motor; and motion transmitting means between the motor and lift arms of a character which increases the efficiency of the motor for lifting the load from the ground to a position of rest upon the load platform of the truck. In other words, the motion transmitting means between the motor and lift arms evens the pressure curve for the complete stroke as compared with the pressure curve according to the assembly shown in the aforesaid Patent No. 2,313,514.

Another object of the invention is to incorporate in loading and hauling equipment means to facilitate depositing the load on the deck or load supporting platform of the truck and to prevent material sidesway of the load with respect to the deck while the truck is traveling.

Other objects and advantages of the invention will appear in the following detailed description, taken in connection with the accompanying drawings, forming a part of this specification, and in which drawings:

Fig. 1 is a view partly in elevation and partly in vertical section, with parts broken away to show details of equipment according to one embodiment of the present invention, certain parts being shown in different positions by dot and dash lines.

Fig. 2 is a detailed view in vertical section of a lift arm and a lever imparting movement thereto.

Fig. 3 is a plan view of the equipment, with parts broken away and shown in horizontal section to disclose details.

Fig. 4 is a rear end elevation of the equipment.

Figs. 5 and 6 are detailed view in elevation and plan, respectively, of portions of the equipment.

Fig. 7 is a fragmentary view in elevation showing a modified form of the invention.

In the drawings A designates a motor truck, only the rear portion of which is shown since the invention is applicable to any suitable type of self-propelled vehicle; B a load or bucket handling unit, including a truck body C, having a load supporting platform D, a hoist E including lift arms F, a motor G and motion transmitting means H operatively connecting the motor and hoist for swinging the lift arms thereof; J a bucket; and K guides which may be provided to assist in centering the bucket in a position of rest upon the platform D and to reduce sidesway or shifting of the bucket to a minimum during travel of the truck.

In the example shown, the truck A includes a chassis frame 10; a rear running gear 11 comprising an axle construction 12 and rear ground wheels 13; and springs 14 between the axle construction and chassis frame.

The truck body C includes, in the example shown, a sub-frame 15 upon a portion of which the load supporting platform D is secured; spaced inner side walls 16 along the sides of platform D defining a load receiving zone 17; outer side walls 18, one for each wall 16 and spaced therefrom to provide elongate compartments 19 for mechanism as hereinafter described, extending longitudinally of the truck; and cross bracing 20 and 21 at the bottoms of compartments 19.

The sub-frame 15 may be formed of rolled metal sections welded or otherwise secured together to form a unit which may be readily secured to the chassis frame 10 in any suitable manner. In the example shown, the sub-frame comprises longitudinal supports or bed rails 22, relatively deep front cross bracing 23 extending laterally beyond the forward ends of rails 22, and relatively shallow rear cross bracing 24 which extends laterally beyond the rear ends of rails 22. If desired, the platform D may be provided with a major section 25 and a removable minor section 26 for the purpose of gaining access to parts of the truck beneath the body C, this removable section being supported by the rails 22 and front cross bracing 23 as shown in Fig. 3. The major section 25 is supported by the rails 22, and cross bracing 23 and 24. Its sides may be secured to the walls 16 in any suitable manner, and in order to provide clearance when swinging the load into and from the load receiving zone 17, it is preferred to have the rear portion 27 of the platform C incline downwardly and rearwardly.

The forward end portions of the walls 16 and 18 as well as cross bracing 20 are supported upon the end portions of cross bracing 23, while the rear end portions of walls 16 may have depending portions 30 secured to the ends of rear cross bracing 24. As shown in Figs. 5 and 6, the outer side walls 18 also have depending arm-like portions 31. It is preferred to have the forward inclined edges 32 of the portions 30 and 31, traversed by an inclined portion 33 of cross bracing 21. The depending portions 30 are provided with aligned shaft bearings 34 the ways 35 of which receive a horizontal, relatively long, transverse load shaft 36 forming a part of the preferred type of hoist E, this shaft being located beneath the juncture of the portions 25 and 27 of platform D. Beneath the axis of shaft 36 are provided aligned shaft bearings 37 and 38 secured to or formed integral with the depending portions 30 and 31, of each of the companion walls 16 and 18, respectively. These companion bearings 37 and 38 and each side of the body support a relatively short transverse shaft 39 forming a part of the preferred motion transmitting means H.

The hoist E in addition to the load shaft 36 and lift arms F, which are detachably secured as by keys 40 to the end portions of the shaft 36, preferably includes a saddle shaft 41 secured to the free end portions 42 of the lift arms, a saddle 43 revoluble on the shaft 41 near each lift arm, collars 44 secured to shaft 41 to retain the saddles to the desired zones of movement on the shaft, depending pairs of saddle chains 45 preferably secured to the saddles by inverted U-bolts 46, and key plates 47 on the lower ends of the chains 45 for detachable connection with headed pins 48 which extend laterally from the sides of the bucket J.

In the form of invention shown more in detail in Figs. 1 and 2 each lift arm F is provided with an elongate straight slot 50 extending longitudinally of the arm. The free end portion 42 of the arm is provided with a hub 51 for receiving the end of saddle shaft 41 and the opposite end is provided with a hub 52 for receiving an end portion of load shaft 36, the hub 52 having a keyway 53 for key 40. The slot 50 is nearer hub 52 than hub 51 and may be provided with a wear plate 54 secured against a longitudinal wall of the slot as by bolts 55.

It will be noted that the lift arms F are pivotally carried by the truck, one adjacent each rear side portion of the platform, to swing in parallel vertical planes longitudinally of the truck. Since these lift arms move loads of considerable weight they are each preferably made to include spaced parallel platelike portions 56 connected by a longitudinal web 57 extending from hub to hub, and forming one longitudinal wall of slot 50, cross webs 58 and 59 forming end walls of slot 50, and a shorter longitudinal web 60 extending from hub 52 to cross web 58 forming the other longitudinal wall of slot 50. It is to web 60 that wear plate 54 is secured, in the example shown.

The hoist E is particularly well adapted, although not necessarily limited for use with a bucket in which the pay load is disposed. Its purpose is to lift a load from a position outside the truck body below the plane 61 of the platform D to a position upon the platform, or vice versa. Therefore the lift arms F may be said to have a major arc 62 of movement from a first position shown by dot and dash lines in Fig. 1 with their free end portions 42 outside the load receiving zone 17 of platform D but near the plane 61, to the vertical 63, and a minor arc of movement 64 from the vertical 63 to a second position shown by full lines in Fig. 1, with their free end portions 42 above and remote from the plane 61 of platform D. The force required to move the lift arms F with its load through arc 62 from the first position, to the vertical, gradually diminishes when loading the truck. Prior to the present invention it has been the practice to apply the force to the lift arms at a fixed point along its length. An example of such is shown in the aforesaid Patent No. 2,313,514. In other words, the lift arm, in the prior construction acted as that class of levers where the effort is between the resistance and the fulcrum and considering the motor as moving at a constant speed during travel of the lift arm through an arc such as arc 62 the speed or velocity ratio between the motor and the lift arm decreased. As a result it was found necessary to provide a high speed power take-off and hydraulic cylinders of relatively large diameter, as a part of the motor in order to supply the force necessary to move the load from an inert position on the ground to a position over the load platform. The motion transmitting means H in the present invention, associated with the motor G overcomes this objection and permits the use of a low speed or standard power take-off and hydraulic cylinders, by way of example, of smaller diameter, since its function is to impart movement of the motor to the lift arm with increased speed ratio from the aforesaid first position shown by dot and dash lines in Fig. 1, to the vertical 63. This reduces the cost of manufacture and permits of a wider load receiving zone 17 above the load supporting platform D, since the hydraulic cylinders of the motor do not require as much room laterally of the truck body as the cylinders of larger diameter previously used.

The preferred type of motor G comprises a pump 66, operated by shaft 67, which may form a part of any suitable power take-off; an oil reservoir 68; valve means 69 for controlling egress and ingress of oil with respect to reservoir 68; two hydraulic cylinders 70 each provided with a piston 71 are piston rod 72 and flexible conduits 73 and 74 connected to the valve means 69 and the forward and rearward ends, respectively of each cylinder 70 whereby the pistons in the cylinders may be reciprocated, the conduit 73 supplying the oil under pressure to the forward end portion of the cylinder for unloading the truck and the conduit 74 supplying oil under pressure to the rear end portion of the cylinder for loading the truck. The cylinders and associated parts are accommodated in the compartments 19 between the walls 16 and 18 and the conduits 73 and 74 may extend downwardly from the cylinders through openings 75 defined by the confronting edges of the cross bracing 20 and 21. The forward end of each cylinder 70 is pivoted to the forward ends of walls 16 and 18, as by lug 76 having trunnions 77 received in bearings 78 and 79 carried by walls 16 and 18, respectively.

Motion transmitting means H, in the example shown comprises a lever 80 and a journal 81 for each lift arm F, the journal 81 operating in the slot 50 of its respective lift arm. It is preferred to make the lever 80 of arcuate or curved form in elevation so as to at all times clear the axis of load shaft 36, and thus permit the removal of the hoist E from the truck without disturbing the levers. It is also preferred to form each lever 80 to comprise spaced parallel plate like portions 82 spaced apart a distance slightly greater than the width of the lift arm F, connected at the fulcrum portion 83 of the lever by a hub portion 84 and arcuate web 85, and connected at the free end portion 86 of the lever by a web 87 adjacent companion bearings 88 rigid with the plate like portions 82. Thus the lever is provided with a slot 89 defined by the adjacent edges of the webs 85 and 87 and the confronting faces of the plate like portions 82. The journal 81 may comprise a cross pin 90 and roller 91 traversing the space between the portions 82 of the lever at the slot 89 as shown in Fig. 2. The hub or fulcrum portion of each lever 80 is pivotally connected to the body C by a shaft 39 the end portions of which are received in bearings 37 and 38 shown in Fig. 6, at an axis below the axis of load shaft 36, with the lift arm extending through slot 89. The piston rod 72 associated with each lever 80 is pivotally connected to the latter as by coupling 93 receiving a cross shaft or pin 94 the end portions of which are received in bearings 88.

Referring more particularly to Fig. 1 it will be noted from the dot and dash line position of the hoist E, bucket J, parts of motor G and motion transmitting means H that the journal 81 is near the end wall 58 of slot 50, remote from the hub portion of fulcrum 52 of the left arm. Upon supplying oil under pressure to the rear end portion of cylinder 70 the piston rod 72 will be retracted drawing the free end position 86 of the lever 80 forwardly, the journal 81 riding in the slot, and imparting an upward swinging movement to the lift arm F. At first, when drawing the saddle chains taut and overcoming the inertia of the bucket J, the lift arm moves slowly as compared with the speed of the motor, but the speed or velocity ratio between the lift arm F and motor gradually increases as the lift arm approaches the vertical where little effort is required to swing the load.

In Fig. 7 is shown a modification of the invention wherein the elongate slot 100 extending longitudinally of the lift arm 101 is curved or of ogee shape instead of straight so as to provide an even slower initial speed or velocity ratio during the period when the motor must overcome the inertia of the load on the ground and elevate it while the lift arm extends rearwardly of the truck acts as a cantilever; and to increase the velocity or speed ratio as the lift arm approaches the vertical and acts more as a strut between the load and the truck. In Fig. 7 there is shown diagrammatically, by double dot and dash lines, various positions of the free end portion 101 of the lift arm as it swings from one position to another. This showing is with the assumption that the piston rod is retracted uniformly to swing the load from a position of rest, outside the truck to a position upon the load supporting platform D and that each double dot and dash arcuate line represents a position of the free end portion of the lift arm, at uniformly measured distances of travel of the piston rod 72.

The guides K are provided to assist in centering the bucket J in a position of rest upon the platform D when the truck is on uneven ground such as with the ground wheels on one side of the truck on a higher surface than that on which the ground wheels on the other side of the truck are located, and to reduce side-sway or shifting of the bucket to a minimum during travel of the truck. The bucket is preferably made so as to have side walls 110 diverging upwardly and outwardly from its bottom 111 since such permits nesting of several buckets for storage and transportation when empty. The companion guides K each preferably comprise a major elongate rectangular plate 112 extending longitudinally of the truck and having its lower longitudinal edge 113 secured to the platform D, and its upper longitudinal edge 114 secured to the side wall 16 of the truck body; the plates 112 of the companion guides at opposite sides of the load receiving zone 17 sloping upwardly and outwardly from the platform D presenting rectangular guide faces 115 in upwardly diverging relation; and minor triangular front and rear guide plates 116 and 117 respectively, located at the ends of each major plate 112.

The front plate 116 of each guide has its base 118 secured to the platform D and its apex 119 secured to the wall 16 at the juncture of edge 114 of plate 112 with wall 16, the bases 118 of the front plates 116 of companion guides diverging forwardly and outwardly with respect to the load receiving zone. Likewise the rear plate 117 of each guide has its base 120 secured to the platform D, its apex 121 to the wall 16, and the bases 120 of the rear plates 117 of companion guides diverge rearwardly and outwardly with respect to the load receiving zone. The guides K are located such that the portions of the guide faces 115 thereof which are nearest one another are spaced apart a distance but slightly greater than the distance between the outer faces of the side walls 110 of the bucket which confront these guide faces 115 when the bucket rests upon the platform. Thus the bucket is guided to a substantially centered position in the load receiving zone, upon the platform, by sliding upon one or the other of the guide faces 115, if the truck is on uneven ground, as previously described.

The front and rear plates 116, 117 strengthen the major plates 112 and assist in loading and unloading the vehicle when material is shoved upon the platform instead of placed there by the hoist.

While I have shown and described two forms of the invention in which the velocity or speed ratio between the lift arms and motor increases as the load is elevated from a position of rest, outside the load receiving zone of the truck to a position in readiness to descend upon the platform, it is to be understood that such is merely by way of example and that various changes in detail and arrangement of parts may be resorted to without departing from the spirit of the invention as defined in the following claims.

I claim:

1. In apparatus for loading, hauling and unloading of materials, the combination of a truck provided with a truck body including a load supporting platform, a hoist carried by the truck for lifting a load from a position outside the truck body below the plane of said platform to a position upon the platform, and vice versa, said hoist including a lift arm pivotally carried by the truck adjacent said platform, movable in a vertical plane and having an arc of movement between a first position with its free end portion to the rear of the truck near the plane of said platform, and a second position with its free end portion remote from and above the plane of said platform, a motor carried by the truck, and motion transmitting means operatively connecting said motor and lift arm for swinging said arm through said arc of movement with increasing speed ratio between the arm and motor as the former moves from said first position to said second position.

2. In apparatus for loading, hauling and unloading of materials, the combination of a truck provided with a truck body including a load supporting platform, a hoist carried by the truck for lifting a load from a position outside the truck body below the plane of said platform to a position upon the platform, and vice versa, said hoist including a lift arm pivotally carried by the truck adjacent said platform movable in a vertical plane, and having an arc of movement between a first position with its free end portion to the rear of the truck near the plane of said platform, and the vertical, and a minor arc of movement between the vertical and a second position with its free end portion remote from and above the plane of said platform, a motor carried by the truck, and motion transmitting means operatively connecting said motor and lift arm for swinging said arm through said major arc of movement with increasing speed ratio between the arm and motor, as the former moves from said first position to the vertical.

3. In apparatus for lifting loads, the combination of a motor truck, a hoist carried thereby, a vertically swinging lift arm pivoted to the truck and having an arc of movement from a first position when the arm is substantially horizontal to a second position where the arm is substantially vertical, a motor carried by the truck, and motion transmitting means operatively connecting said motor and lift arm for swinging said arm through said arc of movement with increasing speed ratio between the arm and motor, as the former moves from said first position to said second position, and at a decreasing speed ratio between said arm and motor as the former moves from said second to said first position.

4. In apparatus for loading, hauling and unloading of materials, the combination of a truck provided with a truck body including a load supporting platform; a hoist carried by the truck for lifting a load from a position outside the truck body below the plane of said platform, to a position upon the platform, and vice versa; said hoist including a vertically swinging lift arm pivotally carried by the truck adjacent said platform and having an arc of movement between a first position with its free end portion outside the load receiving zone of said platform but near the plane thereof, and a second position with its free end portion above the plane of said platform, said arm provided with an elongate slot extending longitudinally thereof; a motor carried by the truck; a lever pivotally carried by said truck at an axis below the pivot of said arm and movable in a plane parallel to the plane of movement of said arm, said lever operatively connected to said motor to be oscillated thereby; and a journal carried by said lever, spaced from its pivot, and movable in the said slot of the lift arm to impart movement of the lever to said lift arm.

5. In apparatus for loading, hauling and unloading of materials, the combination of a truck provided with a truck body including a load supporting platform; a hoist carried by the truck for lifting a load from a position outside the truck body below the plane of said platform, to a position upon the platform, and vice versa, said hoist including a horizontal shaft journaled to extend and removable transversely of the truck body adjacent the plane of said platform and a lift arm detachably secured to each end portion of said shaft, said arms in parallel relation and each provided with a longitudinally extending slot; a motor carried by the truck; a curved lever associated with each of said lift arms, each lever movable in a plane parallel to the plane of movement of its respective lift arm and pivotally carried by the truck at an axis below said shaft, said levers having their curved portions clearing the axis of said shaft, whereby the shaft may be removed transversely of the truck without disturbing said levers, and said levers operatively connected to said motor to be oscillated thereby; and a journal carried by each of said levers, spaced from its pivot and movable in the slot of its respective lift arm to impart movement of the lever to the arm.

6. In apparatus for loading, hauling and unloading of materials, the combination of a truck provided with a truck body including a load supporting platform; a hoist carried by the truck for lifting a load from a position outside the truck body below the plane of said platform, to a position upon the platform, and vice versa, said hoist including a horizontal shaft journaled to extend and removable transversely of the truck body adjacent the plane of said platform and a lift arm detachably secured to each end portion of said shaft, said arms in parallel relation; a motor carried by the truck; a curved lever associated with each of said lift arms, said lever movable in a plane parallel to the plane of movement of its respective lift arm and pivotally carried by the truck at an axis eccentric to the axis of said shaft, said levers having their curved portions clearing the axis of said shaft, whereby the shaft may be removed transversely of the truck without disturbing said levers, and said levers operatively connected to said motor to be oscillated thereby; and means operatively connecting each of said levers to its respective lift arm to impart movement of the former to the latter.

7. In apparatus for loading, hauling and unloading of materials, the combination of a truck provided with a truck body including a load supporting platform; a hoist carried by the truck for lifting a load from a position outside the truck body below the plane of said platform, to a position upon the platform, and vice versa, said hoist including a vertically swinging lift arm pivotally carried by the truck adjacent said platform and having an arc of movement between a first position with its free end portion outside the load receiving zone of said platform but near the plane thereof, and a second position with its free end portion above the plane of said platform, said arm provided with an ogee curved slot extending longitudinally thereof; a motor carried by the truck; a lever pivotally carried by said truck at an axis eccentric to the pivot of said lift arm, and movable in the plane of movement of said arm, said lever operatively connected to said motor to be oscillated thereby; and a journal carried by said lever, spaced from its pivot, and movable in said ogee slot of the lift arm to impart movement of the lever to said lift arm.

8. In loading and hauling equipment, the combination of a truck, a load supporting platform on the truck, a bucket, hoist means carried by the truck including flexible suspension members detachably connected to the bucket for swingably and pendantly lifting the bucket from a position to the rear of the truck and lowering it to a position upon said platform, and spaced apart companion guides for the bucket carried by the truck, having confronting faces sloping upwardly and outwardly from a position above the sides of the platform said sloping faces having the portions thereof which are nearest one another spaced a distance but slightly greater than the distance between the outer side faces of the bucket confronting them when the bucket rests upon said platform, whereby the bucket may be guided while supported by said flexible suspension members to a position of rest on the platform by said guides during operation of said hoist means, and whereby side sway of the bucket with respect to the platform is reduced to a minimum, during travel of the truck.

9. In loading and hauling equipment, the combination of a truck, a load supporting platform on the truck, a bucket provided with side walls diverging upwardly and outwardly from its bottom, a hoist means carried by the truck including flexible suspension members detachably connected to the bucket for swingably and pendantly lifting the bucket from a position to the rear of the truck and lowering it to a position upon said platform, and spaced apart guides for the bucket carried by the truck, having confronting faces diverging upwardly and outwardly from the upper face and at the sides of said platform, the distance between said faces at said platform being but slightly greater than the distance between the outer faces of said side walls at the bottom of the bucket whereby the bucket may be guided while supported by said flexible suspension members to a position of rest on the platform by said guides during operation of said hoist means, and whereby side sway of the bucket with respect to the platform is reduced to a minimum, during travel of the truck.

10. In loading and hauling equipment, the combination of a truck, a load supporting platform on the truck, a bucket provided with side walls diverging upwardly and outwardly from its bottom, a hoist means carried by the truck for lifting the bucket from a position to the rear of the truck and lowering it to a position upon said platform, and spaced apart guides for the bucket carried by the truck, having confronting faces diverging upwardly and outwardly from the upper face and at the sides of said platform, the distance between said faces at said platform being but slightly greater than the distance between the outer faces of said side walls at the bottom of the bucket, and the angle of divergence between said side walls of the bucket being less than the angle of divergence between said faces of the guides, whereby the bucket may be guided to a position of rest on the platform by said guides during operation of said hoist means, and whereby side sway of the bucket with respect to the platform is reduced to a minimum, during travel of the truck.

11. In loading and hauling equipment, the combination of a truck; a truck body comprising a horizontal load supporting platform and spaced side walls extending upwardly therefrom defining a load receiving area on the truck; a bucket; hoist means carried by the truck for lifting the bucket from a position to the rear of the truck and lowering it to a position upon said platform between said side walls; and spaced apart companion guides carried by the truck body, at the confronting faces of said body walls, each guide presenting a major, elongate, rectangular guide face extending longitudinally of the truck and sloping upwardly and outwardly from said platform to the inner face of its respective truck body side wall, and minor triangular front and rear guide faces at the front and rear ends of said major guide face, said minor guide faces having their bases diverging outwardly and their apices at the juncture line between said major guide face and its respective truck body side wall, whereby the bucket may be guided to a position of rest on the platform by said major faces of the guides during operation of the hoist means in depositing the bucket upon the platform and whereby the minor guide faces of the guides facilitate loading of material shoved upon said platform near said side walls of the body by guiding the material to a zone between said major guide faces.

JOHN J. HAY.